US008041476B2

(12) United States Patent
Wempen

(10) Patent No.: US 8,041,476 B2
(45) Date of Patent: Oct. 18, 2011

(54) ERROR MESSAGE DETAILS FOR DEBUG AVAILABLE TO END USER

(75) Inventor: Paul Wempen, Owatonna, MN (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 13/043,166

(22) Filed: Mar. 8, 2011

(65) Prior Publication Data

US 2011/0160953 A1 Jun. 30, 2011

Related U.S. Application Data

(62) Division of application No. 11/979,241, filed on Oct. 31, 2007, now Pat. No. 7,925,398.

(51) Int. Cl.
*G01M 17/00* (2006.01)

(52) U.S. Cl. ............................................ 701/31; 701/33

(58) Field of Classification Search ..................... 701/31
See application file for complete search history.

(56) References Cited

U.S. PATENT DOCUMENTS 5,287,264 A * 2/1994 Arita et al. ...................... 700/79
5,506,773 A * 4/1996 Takaba et al. .................. 701/29
5,815,395 A * 9/1998 Hart et al. ..................... 700/110
6,134,488 A * 10/2000 Sasaki et al. .................... 701/31
6,507,918 B1 * 1/2003 Last et al. ...................... 714/25
6,622,070 B1 * 9/2003 Wacker et al. .................. 701/29
6,836,766 B1 * 12/2004 Gilpin et al. ...................... 706/1
6,842,762 B2 * 1/2005 Raithel et al. ......................... 1/1
2002/0087240 A1 * 7/2002 Raithel et al. .................. 701/35
2005/0015380 A1 * 1/2005 Burkhardt et al. ........... 707/100
2005/0038581 A1 * 2/2005 Kapolka et al. ................ 701/29
2005/0060070 A1 * 3/2005 Kapolka et al. ................ 701/29
2005/0065678 A1 * 3/2005 Smith et al. ..................... 701/29
2006/0149433 A1 * 7/2006 Otsubo et al. .................. 701/29
2006/0217857 A1 * 9/2006 Yoshida et al. ................ 701/31
2007/0204675 A1 * 9/2007 Herzog et al. .................... 73/37
2008/0059782 A1 * 3/2008 Kruse et al. ....................... 713/1
2008/0126865 A1 * 5/2008 Lee ................................ 714/34

* cited by examiner

*Primary Examiner* — Shelley Chen
(74) *Attorney, Agent, or Firm* — Baker & Hostetler LLP

(57) ABSTRACT

A diagnostic tool for diagnosing a vehicle, includes a signal translator communicating with the vehicle in at least one protocol, an input device for inputting information, a processor controlling a software according to the input information from the input device and communication with the vehicle from the signal translator, the processor controlling a reception of diagnostic data of the vehicle through the signal translator, a memory storing a software controlled by the processor, the memory storing information relating to the diagnostic tool and information relating to the configuration of the diagnostic tool and the configuration of the communication with the unit being tested, and an output unit connected to the processor indicating information according to the received and processed information relating to the diagnostic tool and information relating to the diagnosing of the vehicle.

9 Claims, 7 Drawing Sheets

ERROR MESSAGE DETAILS FOR DEBUG AVAILABLE TO END USER

CROSS-REFERENCE TO RELATED APPLICATIONS

The present application claims priority of U.S. patent application Ser. No. 11/979,241, filed on Oct. 31, 2007, the disclosure of which is incorporated herein by reference in its entirety.

FIELD OF THE INVENTION

The present invention relates generally to an automotive diagnostic tool. More particularly, the present invention relates to an automotive diagnostic tool providing enhanced error message details of the configuration of the diagnostic tool.

BACKGROUND OF THE INVENTION

Onboard control computers have become prevalent in motor vehicles. However, as safety, economy, and emissions requirements have continued to tighten, friction braking systems and traction control devices have not met the requirements set out in government regulations and the implicit demands of competitors' achievements. Successive generations of onboard control computers have acquired increasing data sensing and retention capability as the electronics have advanced.

Present external diagnostic and display apparatus, known as diagnostic tools, are commonly limited to reporting the data acquired by the onboard control computer itself. Increasingly, subtle subsystem failures in vehicles overload the ability of maintenance technicians, not simply to read the faults detected and stored by the diagnostic tools themselves, but to combine those readings with peripheral measurements and deduce corrective actions with both speed and accuracy.

Currently, in the automotive industry, there are both stand alone and hand-held diagnostic testers or tools used in connection with motor vehicle maintenance and repair. For example, hand-held diagnostic tools have been used to trouble-shoot faults associated with vehicular control units. Diagnostic tools detect faults based on Diagnostic Trouble Codes or DTCs that are set in the vehicle's onboard control computer. A DTC can be triggered and stored when there is a problem with the vehicle. A technician then retrieves the DTC using a diagnostic tool, repairs the associated problem and then deletes the DTC from the vehicle's computer.

Problems in the diagnostic tool, such as failure of hardware, software, and connection with the vehicle, are difficult to correct. The current diagnostic tools will only show a message indicating there is a communication failure or other error. Then, the technical service personnel have to be called and the technical service personnel have to ask several questions in an attempt to determine whether the user had the diagnostic tool properly configured or not. The questions asked and answered will take an inordinate amount of time. In addition, the entry of the answers may or may not be correct. The verbal relay of the information from the user of the diagnostic tool to the technician has an inherent flaw of potential inaccuracies and a delay of time.

Accordingly, it is desirable to provide a method and apparatus that will allow a user to diagnose the configuration of the diagnostic tool in a more cost effective and efficient manner.

SUMMARY OF THE INVENTION

The foregoing needs are met, to a great extent, by the present invention, wherein in one aspect a technique and apparatus are provided that will allow a technician to use a diagnostic tool to determine the nature of a problem, with error message details for debugging of the diagnostic tool.

In accordance with one embodiment of the invention, a method of operating a diagnostic tool for a vehicle includes the steps of communicating with the vehicle in a communication protocol with a signal translator of the diagnostic tool, determining an error with the configuration or operation of the diagnostic tool with a processor of the diagnostic tool, indicating the error with the configuration or operation of the diagnostic tool with the processor, and displaying, with a display of the diagnostic tool, additional information regarding the error with the configuration of the diagnostic tool.

In accordance with another aspect of the invention, a diagnostic tool for diagnosing a vehicle includes means for communicating with the vehicle in at least one protocol, means for inputting information, means for processing a software according to an inputted information from the means for inputting and communication with the vehicle from the means for communicating, the means for processing controlling a reception of diagnostic data from the vehicle through the means for communicating, the means for processing determining an error with a configuration of the diagnostic tool and the communication with the vehicle, means for storing the software controlled by the means for processing, the means for storing configured to store configuration information of the diagnostic tool and a configuration information of the vehicle, and means for outputting connected to the processor and for outputting received and processed error information of the diagnostic tool, of the configuration of the diagnostic tool and of the configuration of the vehicle.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
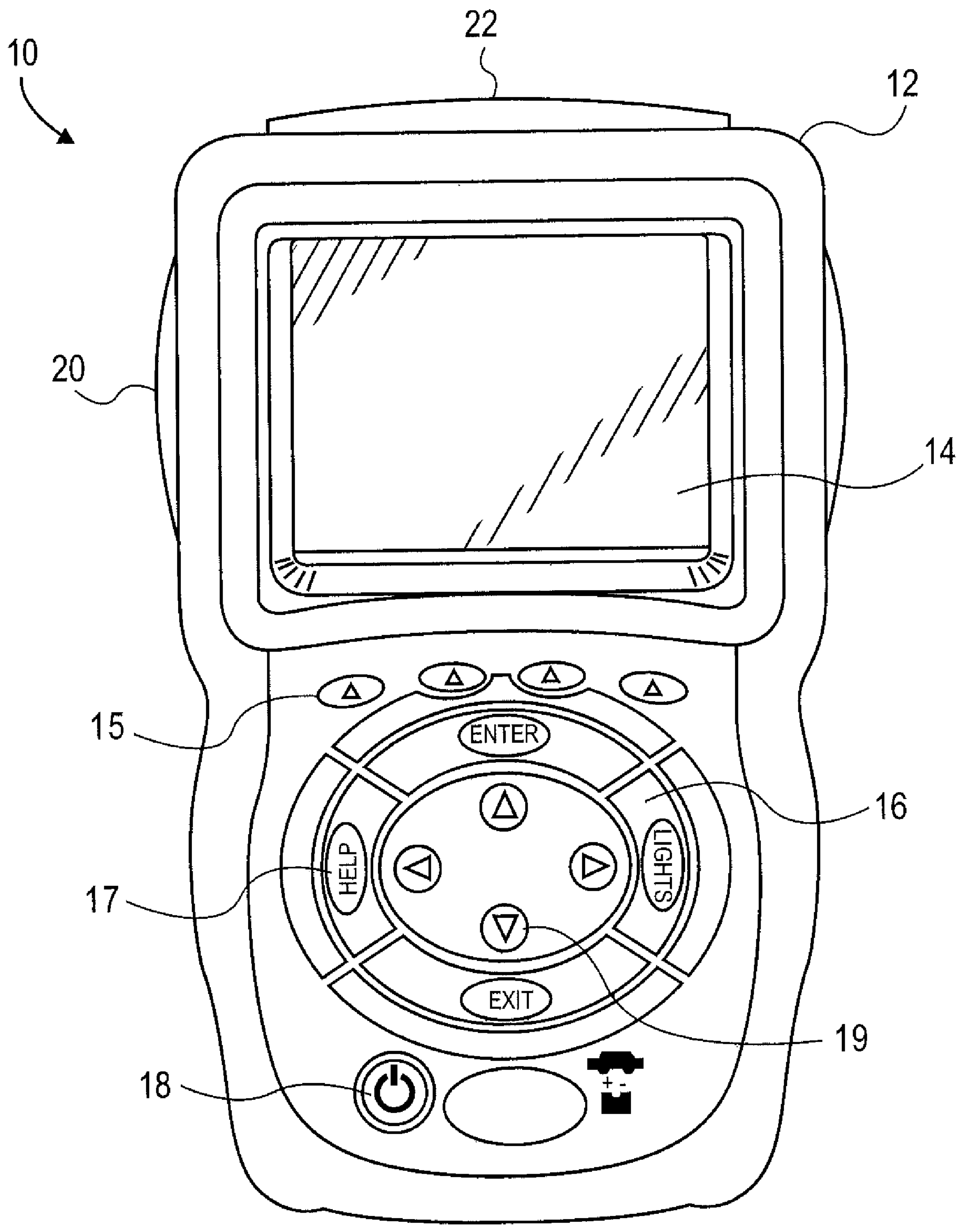
FIG. 1 is a front view illustrating a diagnostic tool according to an embodiment of the invention.

The invention will now be described with reference to the drawing figures, in which like reference numerals refer to like parts throughout. An embodiment in accordance with the present invention provides an apparatus and method that will allow a user, such as a technician, to use a diagnostic tool to determine the nature of a problem, and the tool having error message details for debugging of the diagnostic tool.

Manufacturers have programmed their vehicle onboard computers with complicated methods of detecting a variety of problems. Further, the United States Environmental Protection Agency has mandated that DTCs be set where there are emissions related problems with the vehicle using the Onboard Diagnostic II System, also known as the OBD II system.

However, there are still problems of using the diagnostic tool since there are limitations in troubleshooting the actual cause of the functional anomaly of the diagnostic tool. A user is forced to look directly at the diagnostic tool's limited display that may display only the DTC or simple indicator of function being performed, and a message indicating a communication failure.

In an embodiment of the invention, the diagnostic tool will run an application that accommodates the tool recording the cable used, the exact vehicle configuration that was entered, records communication transmissions and responses, hardware configuration, etc. If the user of the diagnostic tool is in a situation where the tool does not respond as anticipated, the user can indicate such information and communicate such information to a technical service line for interpretation. The information will then help determine if the user had incorrectly configured the tool for the vehicle (incorrect cable, wrong information entered, etc.). Automation of some or the entire process can also be performed.

An embodiment of the inventive apparatus is illustrated in FIG. 1. In particular, FIG. 1 is a front view illustrating a diagnostic tool 10 according to an embodiment of the invention. The diagnostic tool 10 can be any computing device, for example, the NEMISYS diagnostic tool from SERVICE SOLUTIONS (part of the SPX Corporation). The diagnostic tool 10 includes a housing 12 to encase the various components of the diagnostic tool 10, such as a display 14, a user interface 16, a power button 18, a memory card reader 20 and a connector interface 22. The display 14 can be any type display, including, for example, but not limited to, a liquid crystal display (LCD), organic light emitting diode (OLED), field emission display (FED), electroluminescent display (ELD), etc. In addition, the LCD, for example, can be touch screen that both displays and performs the additional task of interfacing between the user and the diagnostic tool 10. The user interface 16 allows the user to interact with the diagnostic tool 10, in order to operate the diagnostic tool as the user prefers. The user interface 16 can include function keys, arrow keys or any other type of keys that can manipulate the diagnostic tool 10 in order to operate the diagnostic tool through the software. The user interface or input device 16 can also be a mouse or any other suitable input device for the user interface 16, including a keypad, touchpad, etc. The user interface 16 can also include keys correlating to numbers or alphanumeric characters. Moreover, as mentioned above, when the display 14 is touch sensitive, the display 14 can supplement or even substitute for the user interface 16. The power key or button 18 allows the user to turn the power to the diagnostic tool 10 on and off, as required.

A memory card reader 20 can be a single type card reader, such as, but not limited to, a compact flash card, floppy disk, memory stick, secure digital, flash memory or other type of memory. The memory card reader 20 can be a reader that reads more than one of the aforementioned memory such as a combination memory card reader. Additionally, the card reader 20 can also read any other computer readable medium, such as CD (compact disc), DVD (digital video or versatile disc), etc.

The connector interface 22 allows the diagnostic tool 10 to connect to an external device, such as, but not limited to, an ECU (electronic control unit) of a vehicle, a computing device, an external communication device (such as a modem), a network, etc. through a wired or wireless connection. Connector interface 22 can also include connections such as a USB (universal serial bus), FIREWIRE (Institute of Electrical and Electronics Engineers (IEEE) 1394), modem, RS232, RS48J, and other connections to communicate with external devices, such as a hard drive, USB drive, CD player, DVD player, or other computer readable medium devices.

Figure 2:
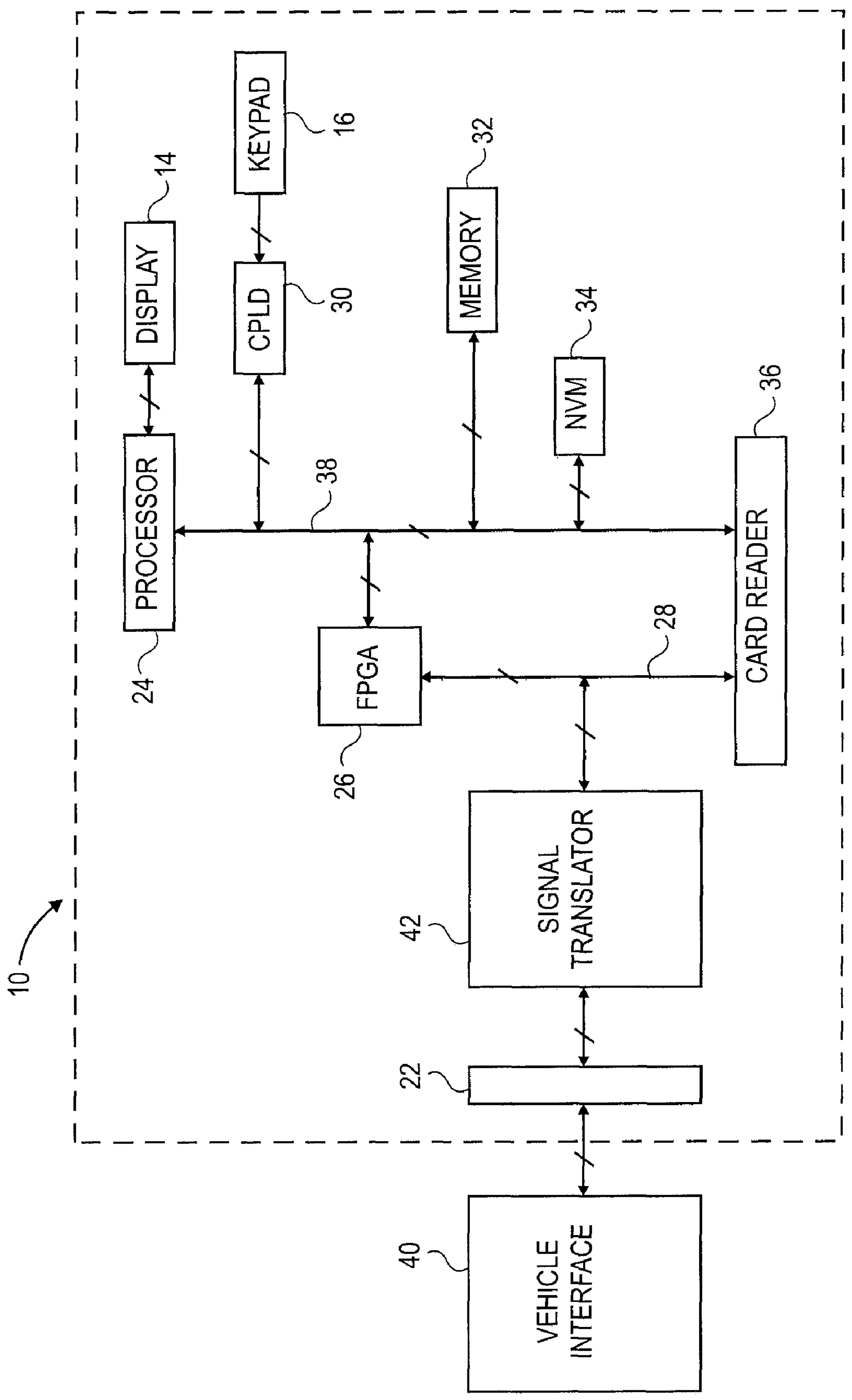
FIG. 2 is a block diagram of the components of a diagnostic tool.

FIG. 2 is a block diagram of the components of a diagnostic tool 10. In FIG. 2, the diagnostic tool 10, according to an embodiment of the invention, includes a processor 24, a field programmable gate array (FPGA) 26, a first system bus 28, the display 14, a complex programmable logic device (CPLD) 30, the user interface 16 in the form of a keypad, a memory subsystem 32, an internal non-volatile memory (NVM) 34, a card reader 36, a second system bus 38, the connector interface 22, and a selectable signal translator 42. A vehicle communication interface 40 is in communication with the diagnostic tool 10 through connector interface 22 via an external cable. The connection between the vehicle communication interface 40 and the connector interface 22 can also be a wireless connection such as BLUETOOTH, infrared device, wireless fidelity (WiFi, e.g. 802.11), etc.

The selectable signal translator 42 communicates with the vehicle communication interface 40 through the connector interface 22. The signal translator 42 conditions signals received from a motor vehicle control unit through the vehicle communication interface 40 to a conditioned signal compatible with the diagnostic tool 10. The translator 42 can communicate with, for example, the communication protocols of J1850 signal, ISO 9141-2 signal, communication collision detection (CCD) (e.g., Chrysler collision detection), data communication links (DCL), serial communication interface (SCI), S/F codes, a solenoid drive, J1708, RS232, controller area network (CAN), or other communication protocols that are implemented in a vehicle.

The circuitry to translate a particular communication protocol can be selected by the FPGA 26 (e.g., by tri-stating unused transceivers) or by providing a keying device that plugs into the connector interface 22 that is provided by diagnostic tool 10 to connect diagnostic tool 10 to vehicle communication interface 40. Translator 42 is also coupled to FPGA 26 and the card reader 36 via the first system bus 28. FPGA 26 transmits to and receives signals (i.e., messages) from the motor vehicle control unit through the translator 42.

FPGA 26 is coupled to the processor 24 through various address, data and control lines by the second system bus 38. FPGA 26 is also coupled to the card reader 36 through the first system bus 28. Processor 24 is also coupled to the display 14 in order to output the desired information to the user. The processor 24 communicates with the CPLD 30 through the second system bus 38. Additionally, the processor 24 is programmed to receive input from the user through the user interface 16 via the CPLD 30. The CPLD 30 provides logic for decoding various inputs from the user of diagnostic tool 10 and also provides the glue-logic for various other interfacing tasks.

Memory subsystem 32 and internal non-volatile memory 34 are coupled to the second system bus 38, which allows for communication with the processor 24 and FPGA 26. Memory subsystem 32 can include an application dependent amount of dynamic random access memory (DRAM), a hard drive, and/or read only memory (ROM). Software to run the diagnostic tool 10 can be stored in the memory subsystem 32. The internal non-volatile memory 34 can be, but not limited to, an electrically erasable programmable read-only memory (EEPROM), flash ROM, or other similar memory. The internal non-volatile memory 34 can provide, for example, storage for boot code, self-diagnostics, various drivers and space for FPGA images, if desired. If less than all of the modules are implemented in FPGA 26, the non-volatile memory 34 can contain downloadable images so that FPGA 26 can be reconfigured for a different group of communication protocols.

Figure 3:
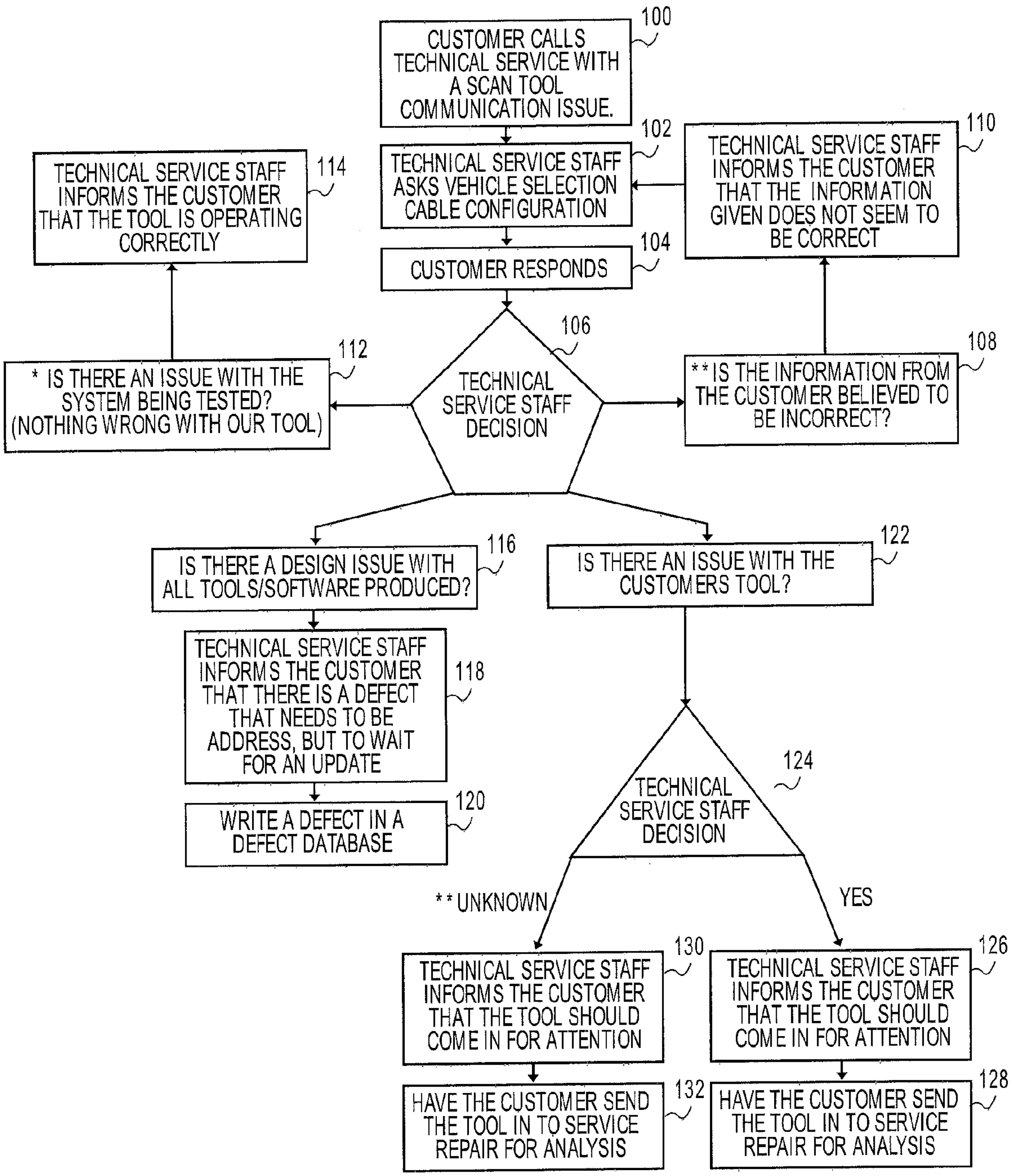
FIG. 3 is a flow diagram of a diagnostic tool illustrating the technique of providing the configuration of the diagnostic tool.

FIG. 3 is a block diagram illustrating one embodiment of the present invention. In particular, FIG. 3 shows a visual representation of the efficiency of the invention. First, the user calls technical service with a scan tool communication issue (step 100), then the technical service staff asks for the vehicle selection cable configuration (step 102). Then, the user responds (step 104) to the technical service staff. After the user responds (step 104), the technical service staff makes a decision in step 106. If the invention is not implemented, there has to be a determination of whether the information from the user is believed to be incorrect in step 108 and then the technical service staff informs the user that the information given does not seem to be correct (step 110). In the invention, steps 108 and 110 can be eliminated since; the information can be transmitted to the technical service staff directly from the diagnostic tool 10, rather than relying on the expertise of the technician.

The technical service staff can make the determination of whether there is an issue with the system being tested such as a determination of whether there is nothing wrong with the diagnostic tool 10 (step 112). The step of checking whether there is an issue with the diagnostic tool being tested is more efficient to determine through the invention because of the information provided directly through the diagnostic tool 10. Then, the technical service staff informs the technician or user that the tool is operating correctly or not (step 114).

The technical service staff can determine whether there is a design issue with all the diagnostic tools or software produced (step 116). Then the technical service staff can inform the user whether there is a defect that needs to be addressed, but for the technician to wait for update or provide the update in a certain period of time (step 118). The defect is then entered into a database (step 120).

The technical service staff can determine whether there is an issue with regard to the diagnostic tool 10 used by the user (step 122). Then, the technical service staff has to make an additional decision (step 124).

If there is an issue with the diagnostic tool, then the technical service staff informs the user that the tool should be sent to, for example, the technical service staff for attention (step 126). Then, the user sends the diagnostic tool 10 into the service repair for analysis (step 128).

If it is unknown whether there is an issue with the diagnostic tool 10, then the technical service staff can inform the user that the tool should come in for attention (step 130) and have the user send the diagnostic tool in to service repair for analysis (step 132). Steps 130 and 132 can be eliminated because of the information provided directly through the diagnostic tool 10, rather than through the expertise of the user or technician. Both the reliability of the information and the volume of information are increased in order to provide a better determination of the analysis of the diagnostic tool configuration.

Figure 4:
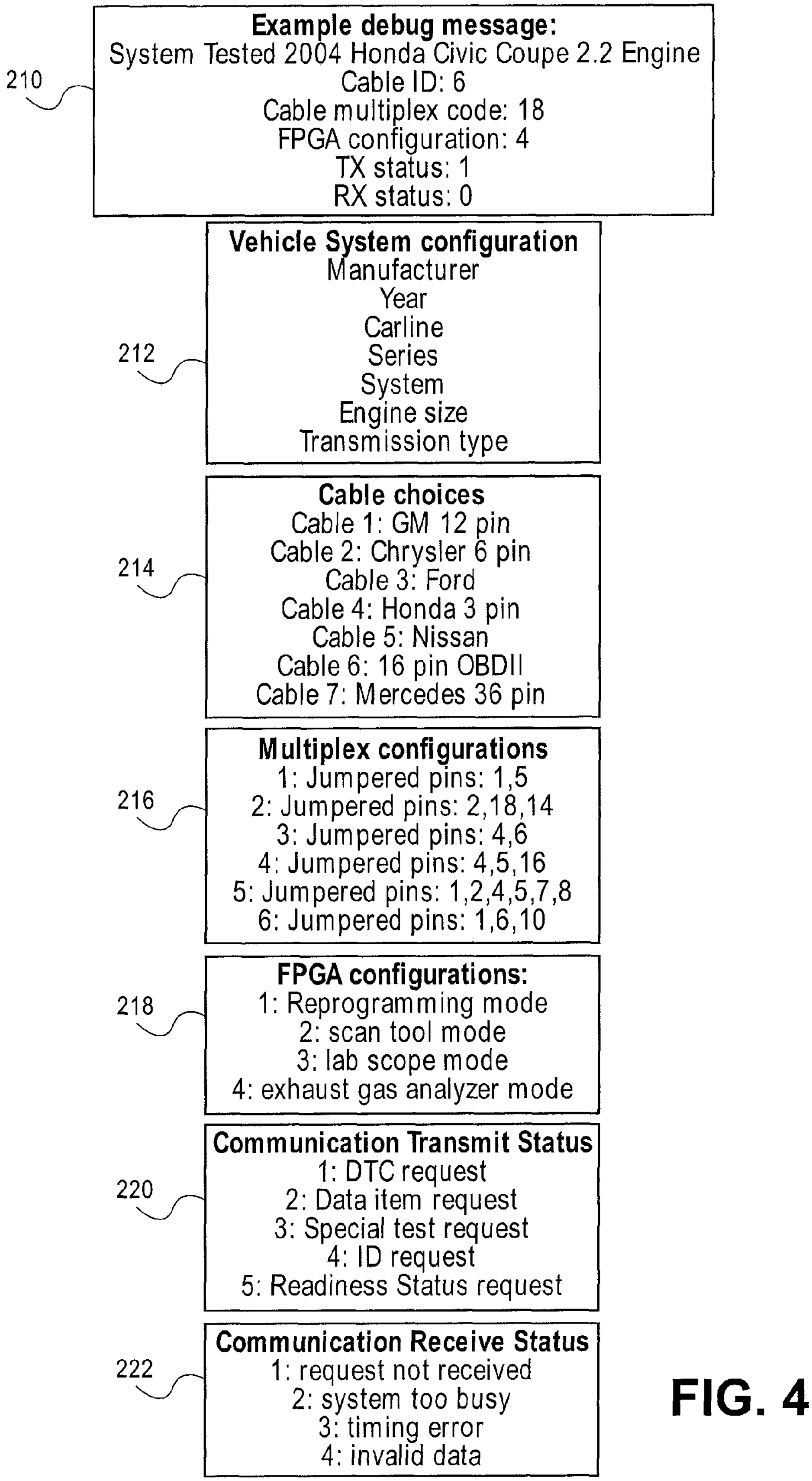
FIG. 4 is a block diagram of the debug messages for the diagnostic tool.

FIG. 4 illustrates example outputs that are displayed on the display 14 of the diagnostic tool 10 and provided to the technical service staff. For example, a debug message 210 includes the system being tested like a certain vehicle. The cable identification connecting the diagnostic tool 10 to the vehicle and also the cable multiplex code is provided. Further, there is the FPGA configuration along with the status of transmit and receive (Tx and Rx, respectively) signals.

The vehicle system 212 that is being tested can also be outputted including, for example, the manufacturer, year of the vehicle, carline, series, system, engine size, and transmission type. The vehicle configuration can be transmitted to the technician service staff, but ordinarily would have to be manually communicated by the interpretation of the user. For example, the user would have to look at the vehicle and check the vehicle's manual or other information or rely on memory to provide the information. However, the invention provides an automatic technique of reading the vehicle configuration and then providing it directly from the diagnostic tool 10 to the technical service staff.

The cable choices 214 that are available can also be automatically provided through the diagnostic tool 10. Ordinarily, the user would have to manually communicate such information to the technical service based on the user's interpretation and knowledge of the cable choices. As seen in FIG. 4, the cable choices 214 can be, for example, a General Motors 12 pin cable (cable 1), Chrysler 6 pin cable (cable 2), a Ford cable as seen in Cable 3, a Honda 3 pin cable (cable 4), etc.

The multiplex configurations 216 and the FPGA configurations 218 can also be automatically determined and provided. Ordinarily, the user would have to send in the diagnostic tool 10 to make such a determination, thus wasting much resources, time, and lost revenue for the user during the down time. The multiplex configurations 216 can be different jumpered pin configurations.

The communication transmit status 220 and communication receive status 222 can also be determined and provided automatically by the diagnostic tool 10. Ordinarily, the communication transmit status 220 and the communication receive status 222 would not be readily known to the user or the technical service staff.

Figure 5:
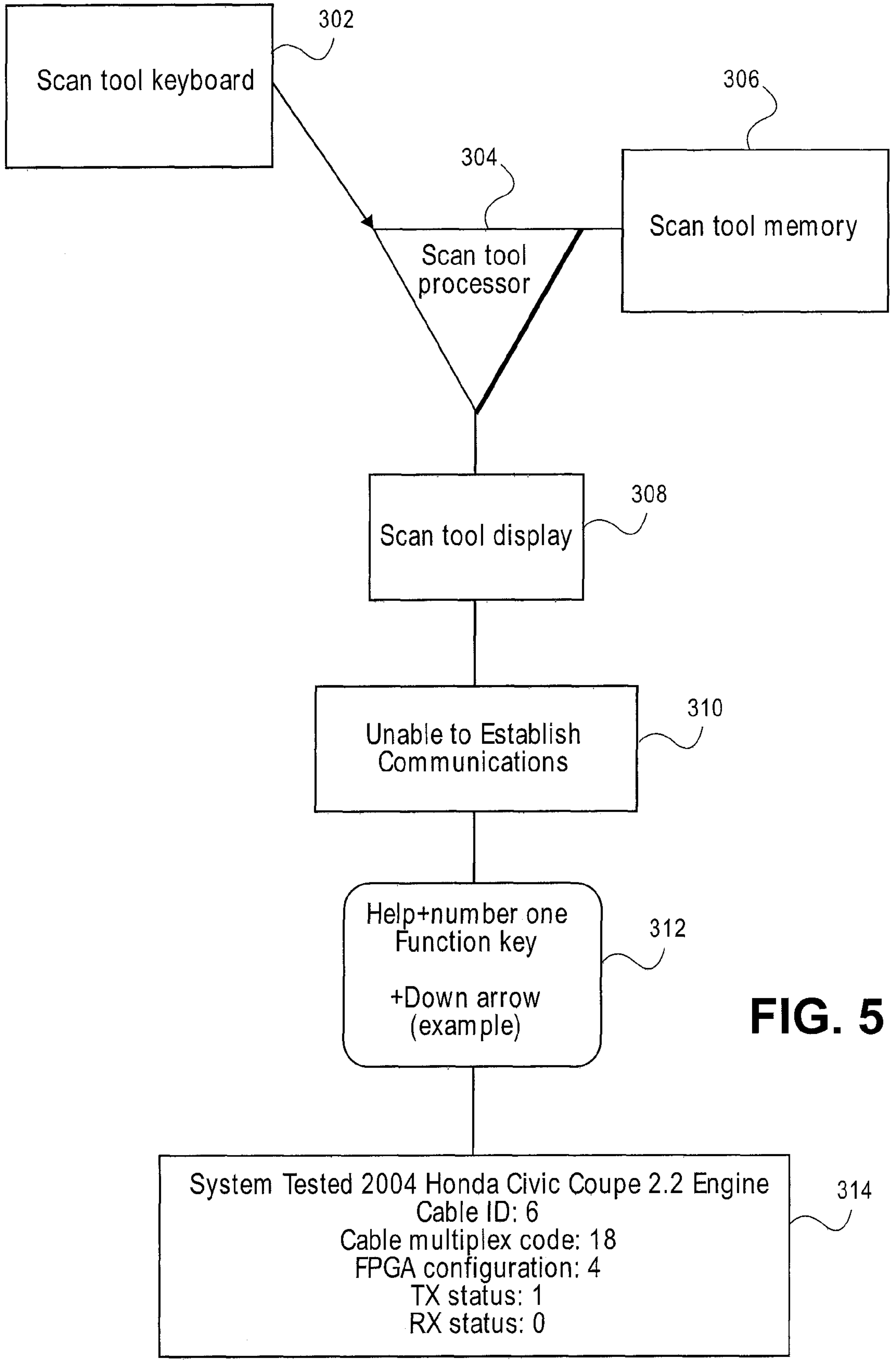
FIG. 5 is a flow diagram showing the method of providing the information for diagnosing the diagnostic tool configuration.

Referring to FIG. 5, the end user can launch the desired software on the diagnostic tool 10 through the keypad 16 or other input device for the diagnostic tool 10 (step 302). Then, through the input of the diagnostic tool 10 in step 302, the processor 24 receives the instructions (step 304) to load the desired software into the memory 32 (step 306). Then, the diagnostic tool launches the desired software, and the user begins using the diagnostic tool software with a display of the output on the diagnostic tool (step 308).

Then, for example, in step 310, if the diagnostic tool 10 is unable to establish communications with the vehicle being tested, the diagnostic tool 10 displays a communication error message. At step 312, the user then presses a series of buttons to determine the debug information, by pressing, for example, the help button 17, the number one function key 15, and then the down arrow 19. The buttons pressed can be just a single button or a series of key strokes on the keypad 16. The system can also be initiated remotely from the technical service staff.

As seen in step 314, the debug message can be appear over the display 14 of the diagnostic tool 10. In addition, such information can be automatically transmitted to the technical service staff or remotely accessed by the technical service staff in a separate location from the user.

Figure 6:
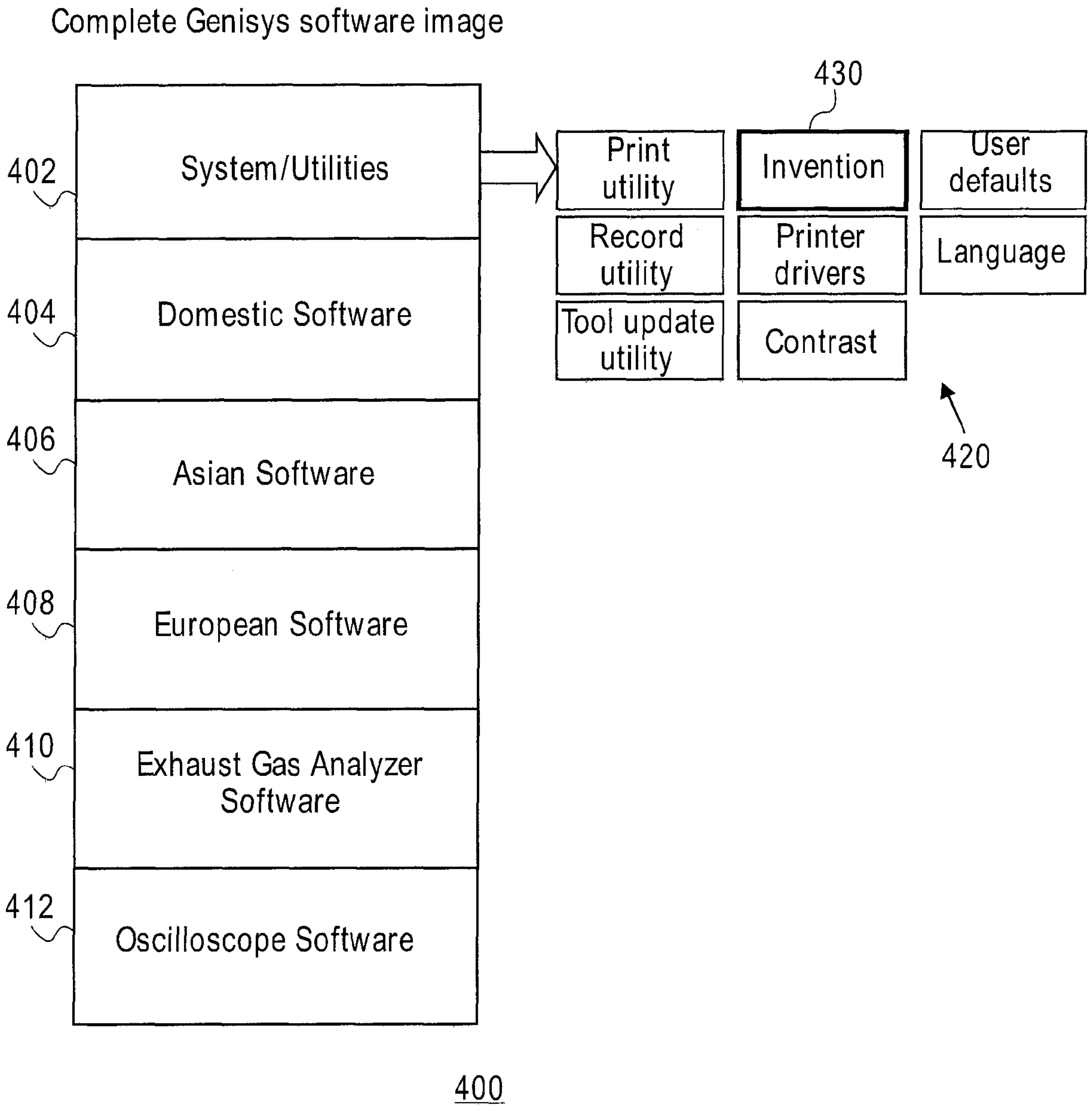
FIG. 6 is a block diagram of the software image.

Referring to FIG. 6, the software 400 that includes the information of the invention 430 can be stored in the system software 402, but can be accessed by all areas of the software. The software image that can be stored in the memory 24, includes, for example, the system utilities 402, domestic software 404, Asian software 406, European software 408, exhaust gas analyzer software 410 and the oscilloscope software 412. All such software modules 402 through 412 have the ability to access the software including the techniques of the invention 430 as shown above. The techniques of the invention 430 are part of the utilities 420 that are all included in the system/utilities module 402.

The present invention can be realized as computer-executable instructions in computer-readable media. The computer-readable media includes all possible kinds of media in which computer-readable data is stored or included or can include any type of data that can be read by a computer or a processing unit. The computer-readable media include, for example, and not limited to storing media, such as magnetic storing media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, other semiconductor media, electronic media, electromagnetic media, infrared, and other communication media such as carrier waves (e.g., transmission via the Internet or another computer). Communication media generally embodies computer-readable instructions, data structures, program modules or other data in a modulated signal such as the carrier waves or other transportable mechanism including any information delivery media. Computer-readable media such as communication media may include wireless media such as radio frequency, infrared microwaves, and wired media such as a wired network. Also, the computer-readable media can store and execute computer-readable codes that are distributed in computers connected via a network. The computer readable medium also includes cooperating or interconnected computer readable media that are in the processing system or are distributed among multiple processing systems that may be local or remote to the processing system. The present invention can include the computer-readable medium having stored thereon a data structure including a plurality of fields containing data representing the techniques of the present invention.

Figure 7:
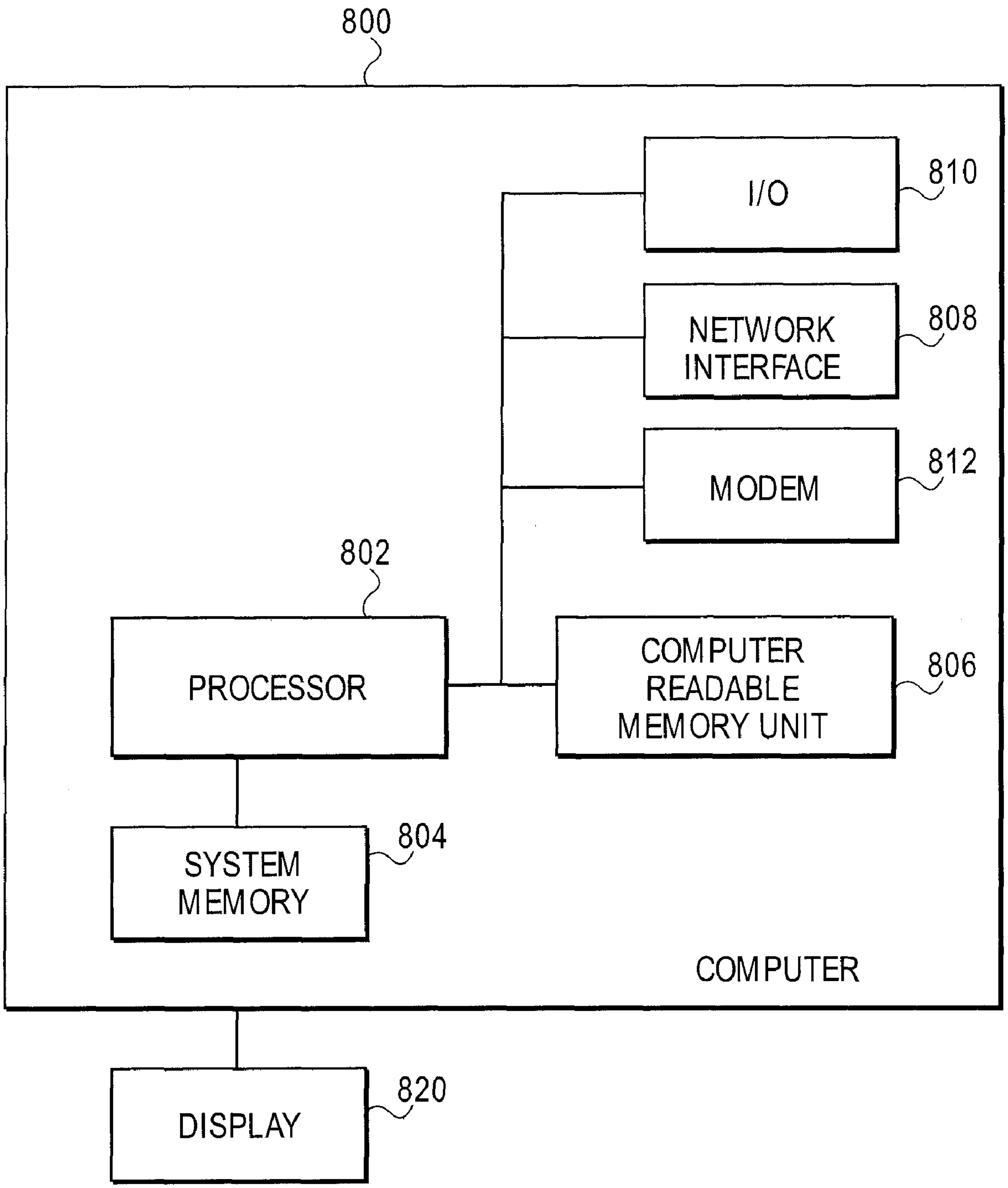
FIG. 7 is a block diagram illustrating an exemplary computer executing the technique of the invention.

Referring to FIG. 7, an example of a computer, but not limited to this example of the computer 800, that can read computer readable media that includes computer-executable instructions of the invention. The computer 800 includes a processor 802 that uses the system memory 804 and a computer readable memory device 806 that includes certain computer readable recording media. A system bus connects the processor 802 to a network interface 808, modem 812 or other interface that accommodates a connection to another computer or network such as the Internet. The system bus may also include an input and output (I/O) interface 810 that accommodate connection to a variety of other devices. Furthermore, the computer 800 can output through, for example, the I/O 810, data for display on a display device 820. The computer can be the remote computer executing the instructions of the invention or can be executing all or part of the instructions of the invention, including for example, being a computer used by the technical service staff and/or the diagnostic tool itself.

Although an example of the diagnostic tool displays or transmits additional error message details for debugging of the diagnostic tool and its setup, it will be appreciated that other techniques for providing the additional information for debugging purposes. Also, although the diagnostic tool is useful to provide the additional information of the diagnostic tool, the communication between the diagnostic tool and the vehicle and the information of the vehicle, additional information can be provided in aiding of the debugging of the operation of the diagnostic tool.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A diagnostic tool for diagnosing a vehicle, comprising:

means for communicating with the vehicle in at least one protocol;

means for inputting information;

means for processing a software according to an inputted information from the means for inputting and communication with the vehicle from the means for communicating, the means for processing controlling a reception of diagnostic data from the vehicle through the means for communicating, the means for processing determining an error with a configuration of the diagnostic tool and the communication with the vehicle;

means for storing the software controlled by the means for processing, the means for storing configured to store configuration information of the diagnostic tool and a configuration information of the vehicle; and means for outputting connected to the means for processing and for outputting received and processed error information of the diagnostic tool, the configuration of the diagnostic tool and the configuration of the vehicle.

2. The diagnostic tool of claim 1, wherein information relating to the diagnostic tool and information relating to the vehicle includes a software configuration of the diagnostic tool, a hardware configuration of the diagnostic tool, the vehicle configuration, communication transmissions and communication responses.

3. The diagnostic tool of claim 1, wherein the means for outputting transmits the stored information to a technical service line for interpretation.

4. The diagnostic tool of claim 1, wherein the means for processing determines any errors within the diagnostic tool and instructs the displaying of the error information and configuration information of the diagnostic tool.

5. The diagnostic tool of claim 1, further comprising means for connecting the means for communicating with a vehicle interface through one of a wired and wireless link to allow for recording of the diagnostic data between the diagnostic tool and the vehicle.

6. The diagnostic tool of claim 1 further comprising means for connecting the diagnostic tool with a remote service center for transmission of configuration information of the diagnostic tool and the configuration information of the vehicle.

7. The diagnostic tool of claim 1, further comprising of means for housing the means for communicating, means for inputting, means for processing, means for storing, and the means for outputting.

8. The diagnostic tool of claim 1, wherein the means for outputting displays the stored information for debugging of errors within the diagnostic tool and the communication with the vehicle.

9. The diagnostic tool of claim 1, wherein the diagnostic tool interfaces with a remote service unit for further analysis of the configuration information of the diagnostic tool, the configuration of the communication between the diagnostic tool and the vehicle, and the configuration information of the vehicle.

* * * * *